G. W. BEARD.
Cotton-Scrapers.

No. 158,457. Patented Jan. 5, 1875.

WITNESSES:
G. Matthys.
John Lemon

INVENTOR:
Geo. W. Beard
BY
ATTORNEYS.

UNITED STATES PATENT OFFICE.

GEORGE W. BEARD, OF GRENADA, MISSISSIPPI.

IMPROVEMENT IN COTTON-SCRAPERS.

Specification forming part of Letters Patent No. 158,457, dated January 5, 1875; application filed November 16, 1874.

*To all whom it may concern:*

Be it known that I, GEORGE W. BEARD, of the city and county of Grenada and State of Mississippi, have invented a new and Improved Cotton-Scraper; and I do hereby declare that the following is a full, clear, and exact description of the same, reference being had to the accompanying drawing, forming a part of this specification, in which—

Figure 1:
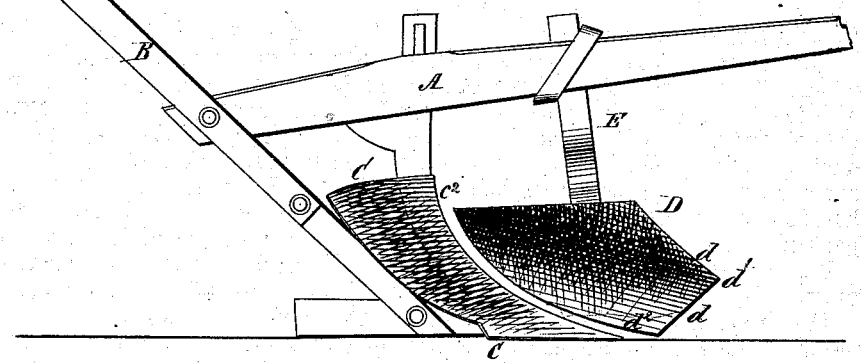
Figure 2:
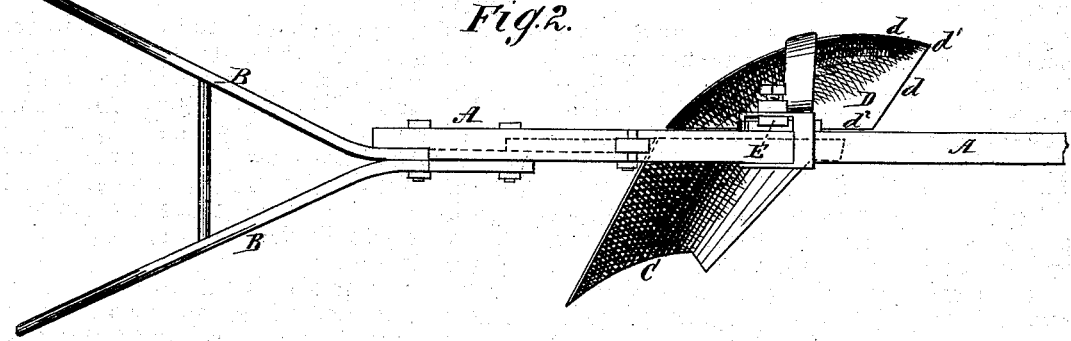

Figure 1 is a side elevation; Fig. 2, a plan view.

The invention relates to the shape and mode of attaching scrapers to a turn-plow; and consists in making the forward or cutting edge of the scraper come to a point at the middle of front, and form an angle with the stopping and retreating upper and lower edges; also, in the relative arrangement of the scraper with respect to the plow, so that what the former shaves from the sides of row will be transferred to the share and mold-board of plow, so as to be turned with the ordinary furrow into the middle of space between rows.

A represents a plow-beam, provided with handles B and an ordinary bar-share plow, C. D is my improved scraper, which is made concave on its working-face, and has two cutting-edges, $d\ d$, that come to a point at $d^1$, the latter forming the vertex of an angle, $d\ d^1\ d$.

By this construction I secure a slanting cut, while the grass and roots cannot lodge on the lance-shaped blade.

It will be observed that the edge $d^2$ of scraper is shaped to correspond with the front curve $c^2$ of plow, and to stand a little farther forward, so that the dirt from the concavity of scraper will readily and easily be passed onto the share and mold-board of plow. I secure this relative position to the scraper and plow by fastening the scraper to the beam by the bent bar E, which is riveted to the former, and attached to the latter by a yoke, wedge, and clamp-screw, or other suitable fastening.

This improvement is on a scraper patented by me August 9, 1859, in which I have since discovered several serious defects that are thought to be remedied by this invention.

I adhered to the attachment principle, which I conceive to be the true one, and the only one by which a scraper may be obtained at once, cheap, and good.

I found that my scraper of 1859 was defective in the shape of the scraper-blade, and in the mode of attachment. The cutting-edge made a square cut through the ground, which caused grass, roots, dead grass, &c., to lodge upon the edge, and clog the plow. This is obviated by making the front edge of my blade D lance-shaped, so as to make a slanting cut. Then again there was a serious defect in the mode of attaching it to the plow. This was done by lapping the scraper-blade over the plow-share, and bolting it through holes, the edge of the scraper and the point of the plow forming an angle, into which were inevitably caught all the roots, grass, &c. The plow thus required to be stopped every few rods, in order to have the obstacles removed.

In the present mode of attaching a scraper I overcome this difficulty by riveting the crooked bar to the scraper and attaching it to the beam. Then, by setting the scraper about one inch away from, and slightly forward of, the plow-share, an aperture is left, so that obstacles which the scraper fails to cut slip off the slanting edges into the aperture, are caught by the plow-share, and thrown off with furrow.

The object gained by this arrangement is, that the plow and scraper act separately and independently of each other in cutting their way through the ground, so that they never clog, while in turning the earth they act in concert, the earth taken up by the scraper at the point passing in a continuous slice over the scraper and plow-share and off into the middle space between the rows.

The large volume of earth thus taken up and turned over is of great advantage in thoroughly covering up foul "middles."

I am aware of the Yost & Taylor scraper attachments, but they lack the shape and mode of arranging, with respect to the plow, that I deem essential to success with the scraper-plow.

Having thus described my invention, what I claim as new is—

The combination, with bar-share plow C, of the scraper D, concaved on its working-face, and having the edge $d^2$ corresponding to that $c^2$ of plow, the said scraper and plow being secured to separate standards, and relatively arranged, as and for the purpose specified.

GEORGE W. BEARD.

Witnesses:
J. W. BEARD,
W. N. BEARD.